A. SCHMIDT.
SPARK PLUG.
APPLICATION FILED AUG. 3, 1912.
1,147,818. Patented July 27, 1915.
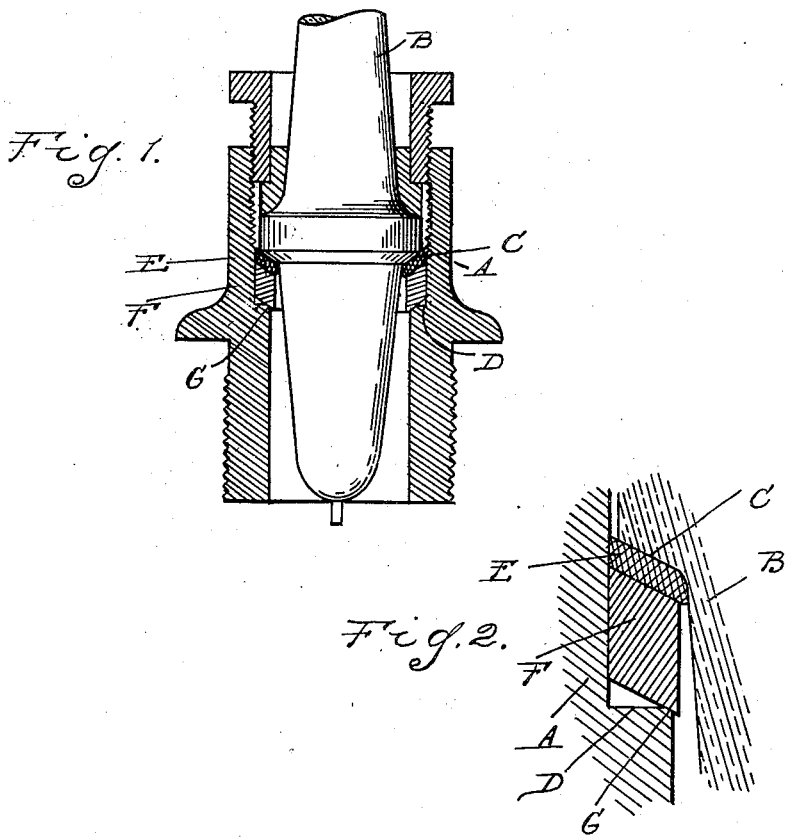
Witnesses
H. B. Ford
James P. Barry
Inventor
Albert Schmidt
By Whittemore Hulbert & Whittemore
Attys

UNITED STATES PATENT OFFICE.

ALBERT SCHMIDT, OF FLINT, MICHIGAN, ASSIGNOR TO CHAMPION IGNITION COMPANY, OF FLINT, MICHIGAN, A CORPORATION OF MICHIGAN.

SPARK-PLUG.

1,147,818.  Specification of Letters Patent.  Patented July 27, 1915.

Application filed August 3, 1912. Serial No. 713,053.

*To all whom it may concern:*

Be it known that I, ALBERT SCHMIDT, a citizen of the Republic of France, residing at Flint, in the county of Genesee and State of Michigan, have invented certain new and useful Improvements in Spark-Plugs, of which the following is a specification, reference being had therein to the accompanying drawings.

The invention relates to spark plugs and has particular reference to the packing means for preventing leakage between the insulator and the metallic case. In the present state of the art, it is usual to place a compressible annular gasket or packing between the opposed shoulders formed upon the porcelain insulator and the metallic case and to compress this packing by a suitable gland. It is, however, necessary to adjust the gland to tighten the packing, and this adjustment often results in a movement of the packing in relation to the surface of the insulator. This insulator surface is more or less irregular and consequently when the packing is removed from the position in which it is fitted it will not perfectly conform to the surface and the plug will therefore leak. With my improved construction I have provided means for retaining the gasket in fixed relation to the porcelain surface, so that adjustment of the plug will not disturb this relation and cause leakage.

In the drawings: Figure 1 is a central longitudinal section through the spark plug. Fig. 2 is an enlarged section of the packing means.

A is the outer metallic case; B the insulator; and C and D opposed shoulders formed upon the insulator and case. Between these opposed shoulders is placed my improved packing comprising a compressible gasket E in contact with the shoulder C of the porcelain, and a metallic ring or washer F between said gasket and the shoulder D. The gasket E is of a sufficiently yieldable nature to conform to the exact surface of the porcelain, compensating for any irregularities therein. The ring or washer F has a true surface substantially parallel with the surface of the porcelain and forming a firm backing for the gasket. The joint between the ring or washer F and the casing A is formed by a knife-edge bearing on the one engaging a surface on the other, this knife-edge G being preferably formed on the member A. The location of the knife-edge bearing is nearer the axis of the porcelain than the mean diameter of the gasket E, with the result that the friction between the gasket and the porcelain is greater than the friction between the ring or collar F and the knife-edge bearing G. Thus if there is any rotative adjustment of the porcelain with respect to the case A this will not disturb the relation between the gasket E and the shoulder C, but will merely effect a rotative adjustment of the collar F on the knife-edge bearing G, and as the latter is a true surface such adjustment will not cause any leakage. Therefore the plug remains gas-tight.

What I claim as my invention is:

1. In a spark plug, the combination with the outer case and the insulator therein, having opposed annular shoulders, of a compressible gasket between said shoulders engaging the shoulder on the insulator, and a solid ring between the gasket and the shoulder on said case, forming a backing for the gasket, said ring having an annular engagement with the shoulder of the case, and the annular engaging portions of the ring and the case shoulder having a less diameter than the mean diameter of the gasket surface bearing against the shoulder of the insulator.

2. In a spark plug, the combination with an outer case and an insulator therein, having opposed shoulders, of a compressible gasket adjacent and conforming to the shoulder on said insulator, a metallic ring forming the backing for said gasket, and an annular knife-edge bearing between said metallic ring and shoulder on the case, having a less diameter than the mean diameter of the gasket surface bearing against the insulator.

3. In a spark plug, the combination with the outer metallic case and the insulator therein, having opposed shoulders, of a compressible gasket between said shoulders adjacent and conforming to the shoulder of the porcelain, a metallic ring or backing for said gasket confined wholly within the space between said gasket and shoulder of the outer metallic case, and a knife-edge bearing between said metallic ring or backing and the shoulder of said case.

4. In a spark plug, the combination with the outer case and the insulator therein, having opposed shoulders, of a yieldable gasket engaging and conforming to the shoulder on said insulator, a solid metallic ring having a true surface substantially parallel with the shoulder on said insulator, said ring being adjacent to said gasket, and a knife-edge bearing between said ring and the shoulder on said outer case.

5. In a spark plug, the combination with the outer metallic case and the insulator therein, having opposed shoulders, of a yieldable gasket between said shoulders adjacent and conforming to the shoulder of the porcelain, a solid metallic ring or backing for said gasket, and a knife-edge bearing between said metallic ring or backing and the shoulder of the case.

In testimony whereof I affix my signature in presence of two witnesses.

ALBERT SCHMIDT.

Witnesses:
MAGIBEL BRICKER,
F. J. UTLEY.